(12) United States Patent
Strutt et al.

(10) Patent No.: US 8,036,168 B2
(45) Date of Patent: Oct. 11, 2011

(54) METHOD AND APPARATUS FOR LINK ADAPTATION BY STOCHASTICALLY SELECTING A TRANSMIT PARAMETER

(75) Inventors: Guenael T. Strutt, Sanford, FL (US); Peter B. Deoge, Orlando, FL (US); Sebnem Zorlu Ozer, North Wales, PA (US)

(73) Assignee: Motorola Solutions, Inc., Schaumburg, IL (US)

( * ) Notice: Subject to any disclaimer, the term of this patent is extended or adjusted under 35 U.S.C. 154(b) by 926 days.

(21) Appl. No.: 12/021,599

(22) Filed: Jan. 29, 2008

(65) Prior Publication Data

US 2009/0190558 A1    Jul. 30, 2009

(51) Int. Cl.
*H04W 4/00* (2009.01)

(52) U.S. Cl. ........................................ 370/329; 370/465

(58) Field of Classification Search .................. 370/332, 370/252, 236, 236.1, 249, 329, 338, 465, 370/468

See application file for complete search history.

(56) References Cited

U.S. PATENT DOCUMENTS

| | | | |
|---|---|---|---|
| 6,940,915 | B2 | 9/2005 | Tang |
| 2005/0128935 | A1 | 6/2005 | Tang et al. |
| 2006/0067256 | A1 | 3/2006 | Alazraki et al. |
| 2006/0285580 | A1* | 12/2006 | Kinnunen et al. ............. 375/147 |
| 2007/0054645 | A1* | 3/2007 | Pan .................. 455/266 |
| 2008/0123578 | A1* | 5/2008 | Golitschek Edler Von Elbwart et al. .............. 370/312 |
| 2008/0144552 | A1* | 6/2008 | Johansson et al. ............ 370/310 |

FOREIGN PATENT DOCUMENTS

| | | |
|---|---|---|
| WO | 0199385 A1 | 12/2001 |
| WO | 0225853 A1 | 3/2002 |

OTHER PUBLICATIONS

PCT/US2009/031481 Search Report mailed May 11, 2009.
M. A. Haleem et al., Members IEEE—"Adaptive Stochastic Iterative Rate Selection for Wireless Channels" er, IEEE Communications Letters, Fol. 8, No. 5, May 2004, pp. 292-294.
D. J. Leith et al, Hamilton Institute, Ireland—"A Self-Managed Distributed Channel Selection Algorithm for WLANs"—RAWNET 2006, Boston, MA—8 pages.
R. Chandramouli et al—"Stochastic channel-adaptive rate control for wireless video transmission"—Pattern Recognition Letters 25—2004—pp. 793-806.
Tim Holliday et al—"Wireless Link Adaptation Policies: QoS for Deadline Constrained Traffic with Imperfect Channel Estimates"—IEEE 2002, pp. 3366-3371.

* cited by examiner

*Primary Examiner* — Brian Nguyen
(74) *Attorney, Agent, or Firm* — Randi L. Karpinia

(57) ABSTRACT

A method and apparatus for link adaptation is provided. A node stores a set of transmit parameters and corresponding selection probabilities for each of the transmit parameters. The node stochastically selects a particular transmit parameter based on the selection probabilities, and then transmits a packet according to the particular selected transmit parameter. From received transmission feedback information, the node derives performance statistics, and uses the performance statistics to specify an estimated performance function for the particular transmit parameter. The node updates a selection probability computation function (SPCF), and uses the SPCF to generate updated selection probabilities corresponding to each transmit parameter in the set of available transmit parameters.

25 Claims, 4 Drawing Sheets

METHOD AND APPARATUS FOR LINK ADAPTATION BY STOCHASTICALLY SELECTING A TRANSMIT PARAMETER

FIELD OF THE DISCLOSURE

The present disclosure relates generally to wireless communication networks and more particularly to link adaptation techniques and stochastically selecting a transmit parameter from a set of available transmit parameters.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network.

Wireless media are inherently volatile and channel quality of a wireless communication link between a transmitter node and a receiver node can vary considerably. The channel quality of a wireless link depends on radio propagation parameters such as path loss, shadow fading, multi-path fading, co-channel interference from other transmitting nodes, sensitivity of the receiver node, available transmitter power margin, and the like. To help ensure a certain level of performance for data communications between nodes, Qualities of service (QoS) procedures are often implemented. QoS procedures take place at several communication layers in a communication protocol stack. For example, at the physical layer, QoS is synonymous with signal-to-interference-and-noise ratio (SINR) or bit error rate (BER) at the receiver of each user. At the data link control (DLC) layer and medium access control (MAC) layer, QoS is usually expressed by packet error rate (PER), minimum achievable data rate and maximum tolerable delay guarantees for users. At higher layers, QoS can be perceived as certain data throughput, delay, delay jitter guarantees, or in terms of fairness in rate allocation. In multi-hop networks, QoS has meaning at the network layer in terms of end-to-end bandwidth/delay guarantees.

To meet QoS requirements, many modern wireless communications systems employ link adaptation techniques, sometimes referred to as adaptive transmission techniques or adaptive modulation and coding (AMC) techniques, to improve throughput or data transmission rates (bits/sec) while maintaining an acceptable bit error rate (BER) at the receiver node regardless of link quality. To implement link adaptation techniques, nodes can dynamically adapt one or more transmit parameters depending on integrity and quality of the channel or link between two nodes. For example, a transmitter node can use transmission feedback information (e.g., received signal quality) to dynamically adapt or select one or more transmit parameters to "match" the channel conditions on the radio link as those conditions change. By exploiting channel information present at the transmitter node, an optimal combination of transmit parameters can be selected so that data throughput (i.e., transmission rates) and system capacity are improved or optimized while acceptable bit error rates (BERs) are achieved. At the physical layer, link adaptation technologies can be used to adjust transmit parameters such as transmission data rate, transmission power, modulation level, symbol rate, coding rate and other signal and protocol parameters to mitigate fluctuation in link quality and to maintain acceptable link quality. A number of different strategies can be used for selecting particular transmit parameters from a set of available transmit parameters.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
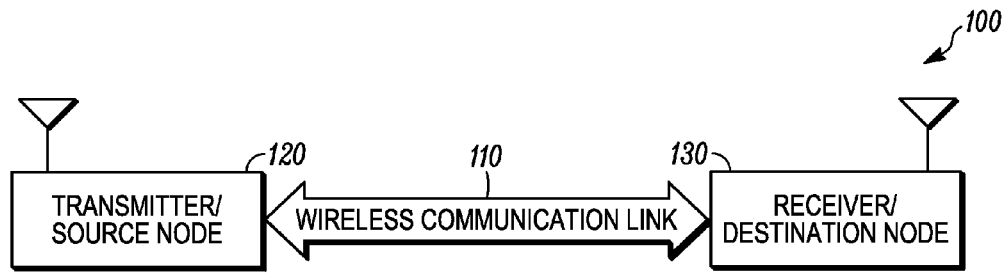
FIG. 1 is a block diagram which illustrates a communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In one implementation, a link adaptation method is provided. A node stores a set of transmit parameters $(v_1 \ldots v_i)$ and corresponding selection probabilities $(P(v_1) \ldots P(v_i))$ for each of the transmit parameters $(v_1 \ldots v_i)$. Each of the transmit parameters $(v_1 \ldots v_i)$ is associated with a corresponding selection probability. The node stochastically selects a particular transmit parameter from a set of available transmit parameters based on the selection probabilities ($P(v_i) \ldots P(v_i)$) associated with each of the transmit parameters, and then transmits a packet according to the particular transmit parameter. The node then receives transmission feedback information (TFI) which relates to transmission of the packet according to the particular transmit parameter, and uses the transmission feedback information to derive performance statistics related to the transmission of the packet according to the particular transmit parameter. The performance statistics comprise an average performance ($\mu_p$) associated with transmission of the packet according to the particular transmit parameter and a performance standard deviation ($\sigma_p$) function for transmission of the packet according to the particular transmit parameter. The node uses the performance statistics to specify an estimated performance function (EPF) (F) for the particular transmit parameter that reflects estimated performance associated with the particular transmit parameter. The EPF (F) comprises an aggressiveness factor ($\beta$) for controlling aggressiveness of the EPF (F). The node determines a normalized performance ($\tilde{F}_i$) that is the ratio of a performance ($F_i$) for transmit parameter i and maximum performance ($F_{max}$), and calculates a stretch factor parameter ($\alpha$) for a target performance ratio ($\gamma$). The node then updates a selection probability computation function (SPCF) based on the stretch factor parameter ($\alpha$) and the measured normalized performance ($\tilde{F}_i$) to generate updated selection probabilities selection probabilities ($P(v_1) \ldots P(v_i)$) corresponding to each transmit parameter ($v_1 \ldots v_i$) in the set of available transmit parameters ($v_1 \ldots v_i$).

In the following description, for purposes of illustrating one example application of the methods and apparatus described herein, opportunistic link adaptation techniques will be described. Although this description is provided to illustrate one example of one possible application of the disclosed techniques, similar techniques can be implemented in a wide variety of other applications for stochastically selecting a sample/object/parameter from a set of samples/objects/parameters to optimize performance of a particular system. For example, the similar techniques can be used to optimize transmit power, fragmentation sizes, channel bandwidth, channel frequency, acknowledgement policy, access control parameters, error-correction coding schemes.

Communication Network

FIG. 1 is a block diagram of a communication network 100 which comprises a source node 120 and a destination node 130 which communicate with one another over a link or channel 110. The link 110 can be wired (e.g., power line communication (PLC)) or wireless, but for purposes of discussion the following description will focus on wireless links. When a wireless link is used as the communication medium, it is assumed that the receiver/destination node 130 is within communication range of the transmitter/source node 120. The nodes 120, 130 can generally be devices designed to receive packetized audio, video and/or data information. The nodes can exchange information as data packets transmitted over one or more communication channels. Some of the components in an illustrative node, such as an illustrative processor, transmitter, receiver and antenna, are described below with reference to FIG. 2. In one implementation, the source node 120 and destination node 130 can be nodes in a wireless network (e.g., a communication device and base station or vice-versa) and can communicate information packets over a communication medium in accordance with a multiple access scheme. Alternatively, in another implementation, the source node 120 and destination node 130 can be nodes in an ad hoc communication network where the nodes have repeater and routing capability.

As used herein, the term "transmitter/source node 120" is defined to be the source of the transmission, not necessarily the source of a particular packet. As used herein, the term "receiver/destination node 130" is defined to be the destination for the transmission, not necessarily the final destination for a particular packet. The term "receiver/destination node 130" can refer to a neighbor node or a next hop node from the transmitter/source node 120. In some situations, the receiver/destination node 130 can be the actual destination of a packet transmitted from the transmitter/source node 120.

Figure 2:
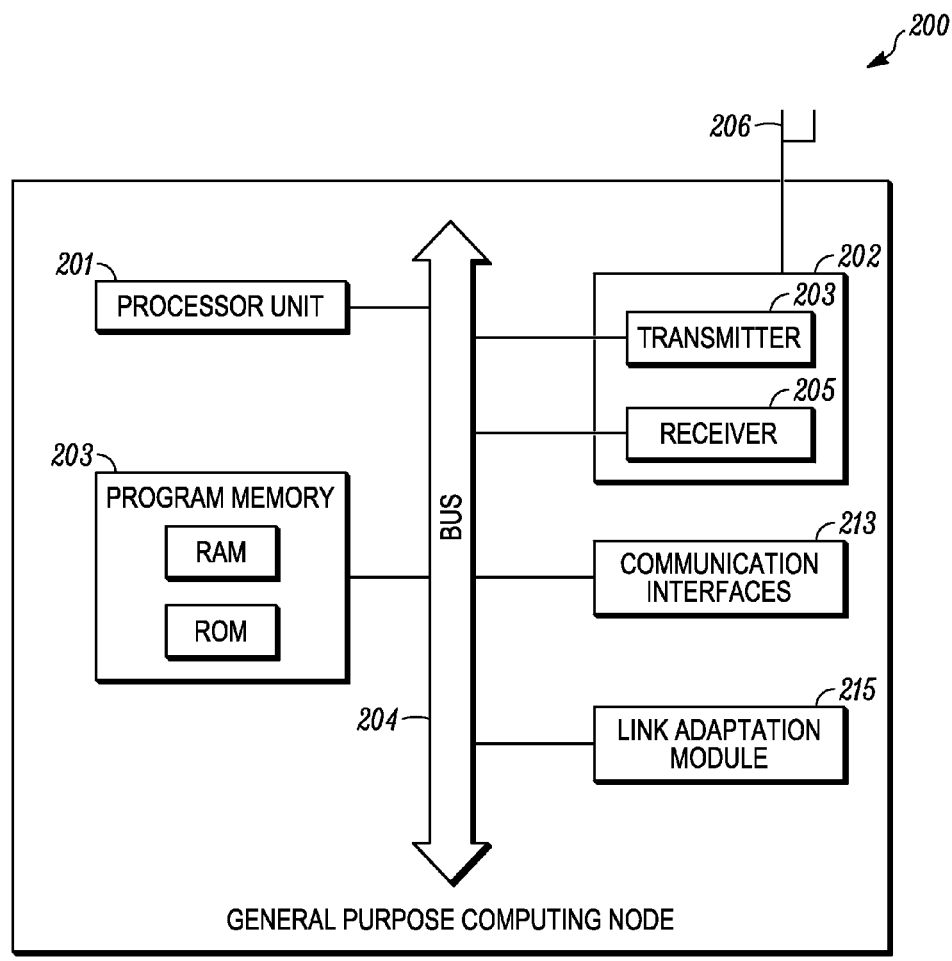
FIG. 2 is a block diagram which illustrates a node in accordance with some embodiments.

A brief overview of some conceptual components in a node will be provided with reference to FIG. 2. FIG. 2 is a block diagram of a node 200 in accordance with some embodiments of the invention. The node 200 comprises a processor 201, a transceiver 202 including a transmitter circuitry 203 and a receiver circuitry 205, an antenna 206, a program memory 209 for storing operating instructions that are executed by the processor 201, one or more communication interfaces 213, and a link adaptation module 215. Although not shown, the node 200 also can include an antenna switch, duplexer, circulator, or other highly isolative means for intermittently providing information packets from the transmitter circuitry 203 to the antenna 206 and from the antenna 206 to the receiver circuitry 205. The node 200 can be, for example, an integrated unit containing at least all the elements depicted in FIG. 2, as well as any other elements necessary for the node 200 to perform its particular functions. Alternatively, the node 200 can comprise a collection of appropriately interconnected units or devices as is well known in the art, wherein such units or devices perform functions that are equivalent to the functions performed by the elements of the node 200. For example, the node 200 can comprise a laptop computer and a LAN (local area network) card.

The processor 201 includes one or more microprocessors, microcontrollers, DSPs (digital signal processors), state machines, logic circuitry, or any other device or devices that process information based on operational or programming instructions. Such operational or programming instructions are stored in the program memory 209. The program memory 209 can be an IC (integrated circuit) memory chip containing any form of RAM (random-access memory) and/or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, and that the memory 209 containing the corresponding operational instructions may be embedded within the state machine or logic circuitry. Although not illustrated in FIG. 2, it will be appreciated by those skilled in the art that communication network protocols executed by the processor 201 can be logically divided into different protocol layers or modules such as a physical layer module, a data link layer module which includes a media access control (MAC) layer module and a logical link layer, and the like, where each layer is a collection of related functions that provides services to the layer above it and receives service from the layer below it. The operations performed by the processor 201 and the rest of the node 200 are described in detail below.

The antenna 206 comprises any known or developed structure for radiating and receiving electromagnetic energy in the frequency range containing the carrier frequencies.

The transmitter circuitry 203 and the receiver circuitry 205 enable the node 200 to communicate information to other nodes and to receive information from the other nodes. In this regard, the transmitter circuitry 203 and the receiver circuitry 205 include conventional circuitry to enable digital or analog transmissions over a communication channel. The implementations of the transmitter circuitry 203 and the receiver circuitry 205 depend on the implementation of the node 200. For example, the transmitter circuitry 203 and the receiver circuitry 205 can be implemented as a modem, or as conventional transmitting and receiving components of two-way communication devices. When the transmitter circuitry 203 and the receiver circuitry 205 are implemented as a modem, the modem can be internal to the node 200 or operationally connectable to the node 200 (e.g., embodied in a radio frequency (RF) modem implemented on Network Interface Card (NIC) such as a Personal Computer Memory Card International Association (PCMCIA) compliant card). For a communication device, the transmitter circuitry 203 and the receiver circuitry 205 are preferably implemented as part of the device hardware and software architecture in accordance with known techniques.

The receiver circuitry 205 is designed to receive wired or wireless signals within multiple frequency bandwidths. The receiver circuitry 205 may optionally comprise any number of receivers such as a first receiver and a second receiver, or one receiver designed to receive in two or more bandwidths. The transceiver 202 includes at least one set of transmitter circuitry 203. At least one transmitter 203 may be designed to transmit to multiple devices on multiple frequency bands. As with the receiver 205, dual or multiple transmitters 203 may optionally be employed.

Most, if not all, of the functions of the transmitter circuitry 203 and/or the receiver circuitry 205 and/or link adaptation module 215 may be implemented in a processor, such as the processor 201. It will be appreciated, however, that the processor 201, the transmitter circuitry 203, the receiver circuitry 205 and link adaptation module 215 have been artificially partitioned herein to facilitate a better understanding.

As described below, the link adaptation module 215 of the node 200 can dynamically select transmit parameters for transmitting data packets over a wireless communication link 110 to the receiver/destination node 130.

Figure 3:
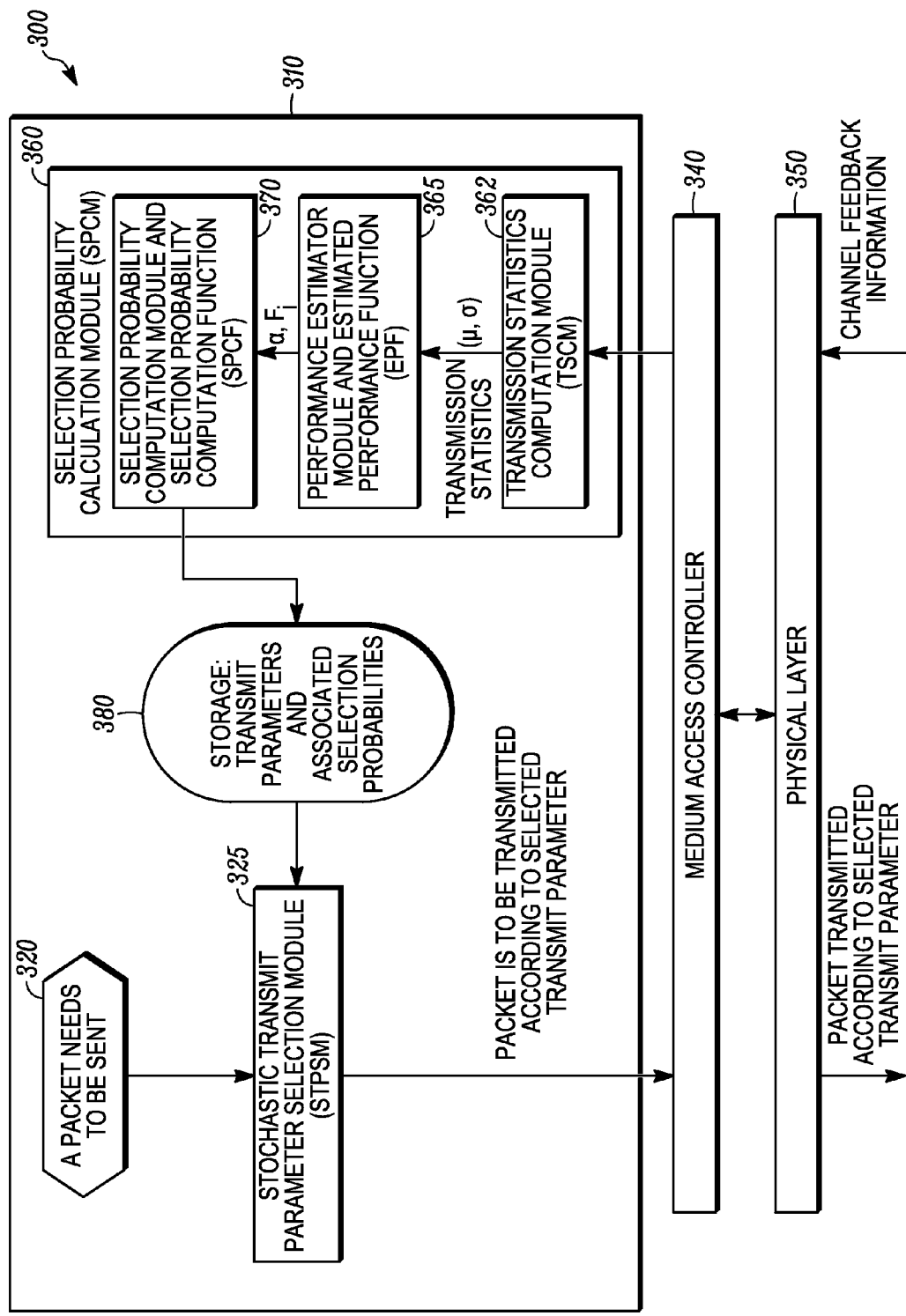
FIG. 3 is a block diagram which illustrates modules of a node including a link adaptation module, a medium access controller (MAC) module, and a physical layer module in accordance with some embodiments.
Figure 4:
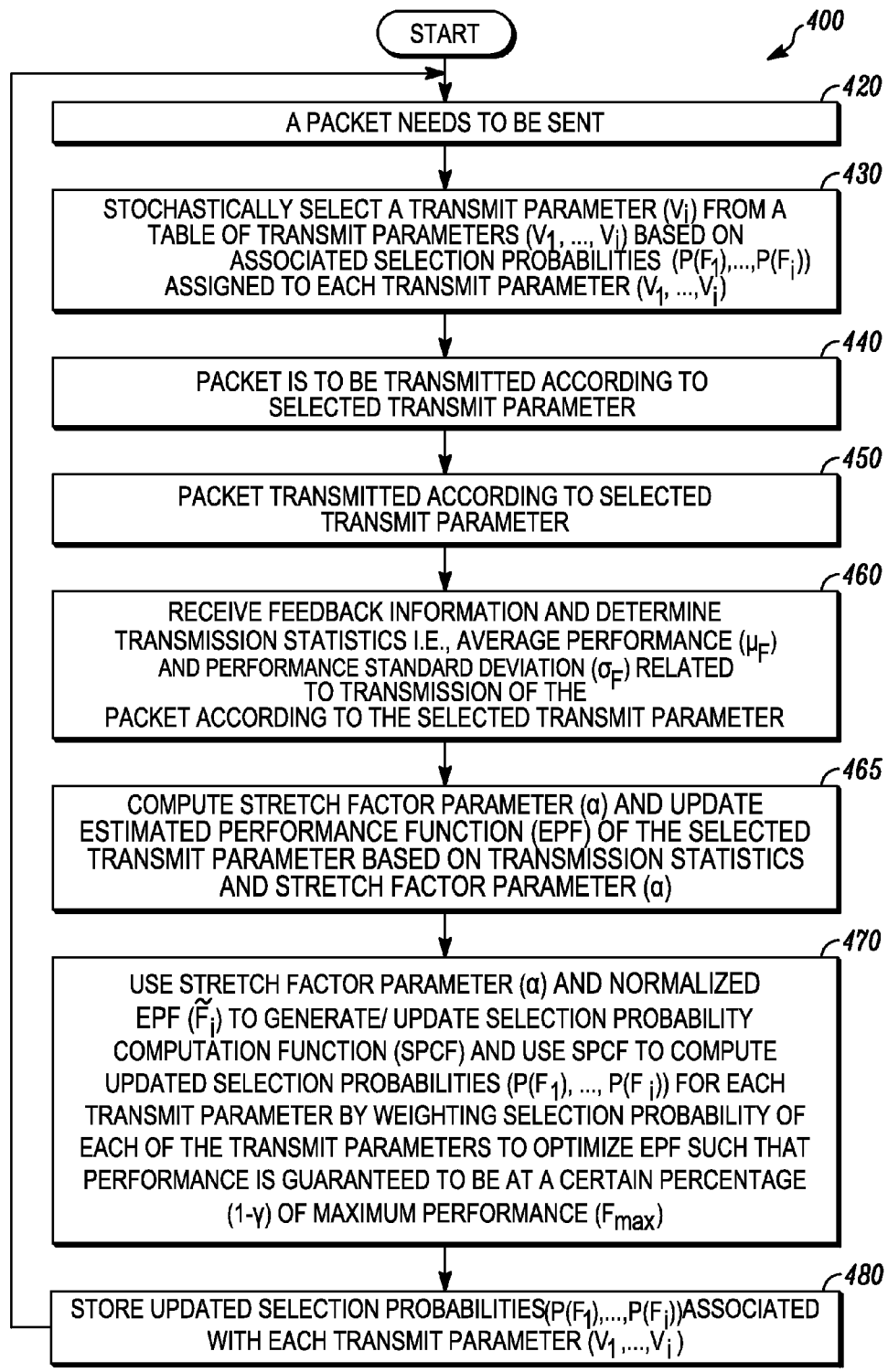
FIG. 4 is a flow chart which illustrates a link adaptation method for selecting a transmit parameter from a set of available transmit parameters in accordance with some embodiments.

FIG. 3 is a block diagram which illustrates modules of a node including a link adaptation module 310, a medium access controller module 340, and a physical layer module 350 in accordance with some embodiments. FIG. 4 is a flow chart which illustrates an opportunistic link adaptation method 400 for selecting a transmit parameter from a set of available transmit parameters in accordance with some embodiments. The opportunistic link adaptation method 400 of FIG. 4 will be described in conjunction with FIG. 3. Although the following description describes a scenario for selecting a transmit parameter that is used to format a single packet, it will be appreciated that the same techniques can be applied to select a transmit parameter used to format a group of packets. In other words, although the following description describes a scenario for selecting a transmit parameter each time a packet is sent, it will be appreciated that the transmit parameter can be selected less frequently and used for a particular duration before another transmit parameter is selected. Moreover, although FIGS. 3 and 4 describe techniques for selecting a transmit parameter (e.g., a data rate) from a set of available transmit parameters (e.g., data rates), it will be appreciated that multiple instances of these techniques can be implemented in parallel to simultaneously select another, different transmit parameter from another set of available transmit parameters. For example, one instance of method 400 can be used to select a particular data rate from a set of available data rates, another instance of method 400 can be used to select a particular modulation level from a set of available modulation levels, another instance of method 400 can be used to select a particular coding rate from a set of available coding rates, etc.

The link adaptation module 310 can be implemented as part of the medium access controller module 340 or as a separate sub-layer or sub-module 310 which communicates with the medium access controller module 340. The link adaptation module 310 can generally be used to select a particular transmit parameter from a set of available transmit parameters as part of a link adaptation method 400 to optimize performance of a transmitter node. As used herein, the term "transmit parameter" can generally refer to link adaptation parameters including physical layer parameters such as a transmission data rate, transmission power level, coding rate, modulation level and transmission power. As used herein, the term "performance" can generally refer to parameters which can be used to characterize performance of a transmission over a wireless link, such as transmission throughput, channel efficiency, transmission time, transmission energy, queuing delay, end-to-end latency, voice/video quality, etc.

Operations of the MAC module 340 and the physical layer module 350 are well-known in the art and will not be described in detail herein. In FIG. 2, the MAC module 340 and the physical layer module 350 are implemented as part of a communication networking protocol stack that is executed by the processor unit 201, the transceiver 202, and/or the program memory 203. The MAC module 340 and the physical layer module 350 can be adaptively configured to transmit using different transmit parameters, and may operating according to any known multiple access technique such as as Carrier Sense Multiple Access With Collision Avoidance (CSMA/CA), Multiple Access with Collision Avoidance (MACA), Time Division Multiple Access (TDMA), Code Division Multiple Access (CDMA), Orthogonal Frequency Division Multiple Access (OFDMA), etc. The physical layer module 350 may operate according to a particular combination of physical layer parameters (e.g., supported data rates, radio frequency (RF) channels, carrier spacing(s), modulation levels, coding rates, etc.)

The link adaptation module 310 comprises a stochastic transmit parameter selection module (STPSM) 325, a selection probability calculation module (SPCM) 360 that includes a transmission statistics computation module (TSCM) 362, a performance estimator module 365 and a selection probability computation module 370, and a storage block 380 that stores a finite list of available transmit parameters and their corresponding selection probabilities.

In one embodiment, each particular value ($v_i$) of a transmit parameter is associated with a particular selection probability $P(v_i)$ and vice-versa. Each selection probability $P(v_i)$ is dependent on an estimated performance function (EPF) ($F_i$) that is being controlled. The sum of all selection probabilities $P(v_i)$ is one (1). As used herein, the term "selection probability" $P(v_i)$ refers to a percentage that reflects a number of times a particular transmit parameter ($v_i$) (e.g., a particular data rate) in a set of possible transmit parameters ($v_1, \ldots, v_i$) is to be selected with respect to all other possible selection probabilities $P(v_i)$.

In one implementation, illustrated below in Table 1, the storage block 380 can store the list of available transmit parameters ($v_1, \ldots v_i$) and their corresponding selection probabilities ($P(v_i), \ldots, P(v_i)$) in a look-up table, where each of the selection probabilities ($P(v_i), \ldots, P(v_i)$) is an estimated performance function $(P_1, \ldots, P_i)$. In one implementation, the link adaptation module 310 can initially be pre-loaded with a set of default transmit parameters $(v_1, \ldots v_i)$ that are then adaptively re-computed each time a packet is transmitted (or alternatively, each time method 400 executes). Techniques for updating the transmit parameters $(v_1, \ldots v_i)$ and their corresponding selection probabilities $(P(v_i), \ldots, P(v_i))$ will be described in greater detail below.

TABLE 1

LOOK-UP TABLE WITH SELECTION PROBABILITIES FOR EACH VALUE OF A PARTICULAR TRANSMIT PARAMETER

| VALUE OF TRANSMIT PARAMETER | SELECTION PROBABILITY |
|---|---|
| $v_1$ | $P(v_1)$ |
| $v_2$ | $P(v_2)$ |
| $v_3$ | $P(v_3)$ |
| $v_4$ | $P(v_4)$ |
| ... | ... |
| $v_i$ | $P(v_i)$ |

As indicated at block 320 and step 420, the link adaptation module 310 operates any time the node prepares to transmit a packet or group of packets (or other unit of data such as a frame, block, or pre-defined transmission burst) over a wireless communication link or "over-the-air (OTA)." When the link adaptation module 310 prepares to send the packet, at step 430, the STPSM 325 stochastically selects one of the transmit parameters from the set of available transmit parameters $(v_1, \ldots v_i)$ that is stored at storage block 380 based on the selection probabilities associated with each of the transmit parameters. In one implementation, the STPSM 325 comprises a random number generator or other pre-computed table which generates a random number that is compared to the set of selection probabilities. The transmit parameter that corresponds to the random number generated is selected for transmission. This procedure can be efficiently performed using lookup tables that may be preloaded or computed at runtime.

At step 440, the link adaptation module 310 sends the packet to the MAC module 340 along with an indication that the packet is to be transmitted according to the selected transmit parameter. The MAC module 340 processes the packet to prepare it for transmission over the wireless link in accordance with the selected transmit parameter, and passes the packet to the physical layer module 350, where the packet is prepared for transmission in accordance with the selected transmit parameter. At step 450, the physical layer module 350 then transmits the packet, which is transmitted in accordance with the selected transmit parameter, over the wireless link towards its destination node.

After transmitting the packet according to the selected transmit parameter, at step 460, the physical layer module 350 eventually receives feedback information regarding the transmission (referred to herein as "transmission feedback information") from other nodes and passes this transmission feedback information up the protocol stack. In one implementation, the transmission feedback information may comprise explicit acknowledgment (ACK) messages sent from the destination node(s) that indicate that the data sent by the source node arrived properly (i.e., that report whether the source node's data payload has been successfully delivered to the destination node) or explicit negative acknowledgment (NACK) messages sent from the destination node which indicate that the destination node has detected a problem with the data payload. In other implementations, the transmission feedback information may take the form of implicit ACK/NACK messages (i.e., where the source node does not receive any response from the destination node, and the source node assumes that there was a problem with the data payload such as a lost packet). Such transmission feedback may occur immediately or be delayed using a variety of delayed-acknowledgement methods. Transmission feedback information is processed at the time it is received in order to keep performance estimation as up-to-date as possible.

The transmission statistics computation module (TSCM) 362 uses/processes the transmission feedback information received over the wireless link to determine or derive (e.g., collect, measure and/or compute) transmission statistics related to the transmission of the packet that was transmitted at (or in accordance with) the selected transmit parameter. The transmission statistics are "indicators of transmission performance" and can include, for example, the mean and standard deviation of the estimated transmission performance function. Actual transmission performance for a particular setting is not measurable due to the fact that the link is live (i.e., being used for communication and probing at the same time). Different transmit parameters are used at different times to gather information about performance using different settings; the overall performance is a function of the usage of a variety of transmit parameters. Only an aggregate performance can be directly measured. Individual performance for each transmit parameter has to be estimated using limited information spread over a period of time. Thus, a transmit parameter that is rarely used will have a lot of uncertainty associated with it. Inversely, a transmit parameter that is used often will have a lower uncertainty—its actual performance will be closer to the average measured performance. Thus, it is beneficial to use both an average performance together with an uncertainty factor (such as a standard deviation) in estimating the performance of a link using a particular transmit parameter. In the implementation illustrated in FIG. 3, the MAC module 340 provides the transmission statistics to the performance estimator module 365 of the link adaptation module 310.

At step 460, the transmission statistics computation module (TSCM) 362 uses the transmission feedback information to derive performance statistics related to the transmission of the packet that was transmitted at the selected transmit parameter. In one implementation, the transmission statistics computation module (TSCM) 362 processes transmission feedback information received over the wireless link to determine (e.g., collect, measure and/or compute) the performance statistics related to transmission of the packet that was transmitted at the selected transmit parameter. In this particular implementation, the performance statistics are "indicators of transmission performance" and can include, for example, an average performance $(\mu_F)$ and a performance standard deviation $(\sigma_F)$. The average performance $(\mu_F)$ is straightforward to compute. The average performance $(\mu_F)$ is a function that estimates performance at one particular transmit parameter. There are as many estimates as there are transmit parameters. The performance standard deviation $(\sigma_F)$ is largely dependent on a choice of standard deviation measurement method, and a choice of confidence interval.

Estimated Performance Function (EPF)

The performance statistics are provided to the performance estimator module 365 of the link adaptation module 310. At step 465, the performance estimator module 365 uses the performance statistics (for the packet(s) that were transmitted at the selected transmit parameter) to create or update the estimated performance function (EPF) for the selected transmit parameter. In this implementation, the selection probability computation module 370 generates the EPF based on the average performance ($\mu_F$) and the performance standard deviation ($v_F$). Stated differently, the average performance ($\mu_F$) and the performance standard deviation ($\sigma_F$) are used to define estimated performance function (EPF) (F) that reflects estimated performance associated with the selected transmit parameter. An example of the EPF is shown below in equation (A1).

$$F = \mu_F - (\sigma_F \cdot (1-2\beta)) \tag{A1}$$

As noted above, the performance standard deviation ($\sigma_p$) is largely dependent on a choice of standard deviation measurement method and a choice of confidence interval, and this dependency can be used to control the "aggressiveness" of the transmit parameter selection algorithm. Changing the confidence interval or the standard deviation measurement method does not make one transmit parameter more likely to be better than another from a performance standpoint.

Aggressiveness Factor ($\beta$)

In the estimated performance function (EPF), an aggressiveness factor ($\beta$) is used to change the EPF (F) from a lower end of an arbitrary confidence interval to an upper end.

There are two rationales for measuring the standard deviation ($\sigma_F$) of the performance estimate.

If transmit parameters are to be tried that are potentially better but have not been investigated or tried often, it makes sense to favor transmit parameters with large means (or averages) and large standard deviations, which indicates that these transmit parameters have not been tried often and their prediction is good. In this "aggressive" case, a large value of the EPF (F) is the most favorable criterion, and therefore it is beneficial to use a larger aggressiveness factor ($\beta$), where an aggressiveness factor ($\beta$) of one (1) is the most aggressive setting. If aggressiveness factor ($\beta$) is 1 then the value of the EPF (P) is equal to the sum of the average performance ($\mu_F$) and the performance standard deviation ($\sigma_F$), and is therefore at the high end of the range of possible values of the EPF (F).

If the objective is to use transmit parameters that are known to perform well, it is beneficial to favor transmit parameters with large means and small standard deviations (which indicate that they are good, based on past experience). In this "conservative" case, a small value of the EPF (F) is the most favorable criterion, and therefore it is beneficial to use a smaller aggressiveness factor ($\beta$), where an aggressiveness factor ($\beta$) of zero (0) is the most conservative setting. If aggressiveness factor ($\beta$) is 0 then the value of the EPF (F) is equal to the difference between the average performance ($\mu_F$) and the performance standard deviation ($\sigma_F$), and is therefore at the low end of the range of possible values of the EPF (F).

An aggressiveness factor of 0.5 means that the value of the EPF (F) will always be the average performance ($\mu_F$), which will naturally favor optimistic predictions.

In one implementation, performance standard deviation ($\sigma_F$) is preferably calculated using a student t-distribution given that the number of samples is often limited by the available bandwidth of the system. In the context of transmit parameter selection, it is preferable to use an aggressive approach for initial trials and a conservative for final trials (those that occur close to a packet being dropped and no longer retried). If the overall success transmit parameter is fairly low (for example, when the system is being trained or the environment changes too fast), an initial aggressive approach can be subdued, and made more conservative. The range of variation of performance standard deviation ($\sigma_F$) is driven by the confidence level assigned to the t-distribution since the performance standard deviation ($\sigma_F$) itself is not being estimated, but rather the confidence interval of the average performance ($\mu_F$) is being estimated.

In one implementation, the EPF is converted into a selection probability or selection order. The EPFs are actual possible outcomes (i.e., not random variables). The performance estimates are random variables, and therefore a probability of one being larger than the other can be established. This probability, however, is equivocal (equal to 0.5) when there are few measurements. The "approach", therefore, is a better criterion for selecting an order. Arbitrarily, an EPF that is twice as large should be twice as likely to be selected. This can be generalized to:

$$P(F_i) = k^\alpha \cdot P(F_j) \text{ for } F_i = k \cdot F_j \tag{B1}$$

The EPFs ($P(F_i)$, $P(F_j)$) are performance estimate functions associated with particular transmit parameters i, j. The performance of a particular transmit parameter is an "estimate" since it can not be measured when it is only used sporadically. In equation (B1), k represents the ratio of an estimated performance function (EPF) associated with transmit parameter i ($P(F_i)$) with respect to an estimated performance function (EPF) associated with transmit parameter j ($P(F_j)$), and the parameter $\alpha$ is a "stretch factor parameter." The stretch factor parameter ($\alpha$) determines the proportionality relationship between the priority order and the performance estimation. The setting of the stretch factor parameter ($\alpha$) depends on how much penalty is acceptable from a performance perspective as compared to the maximum performance in order to "try out" other possibilities. A large stretch factor parameter ($\alpha$) allows for larger performance parameters/estimates to be selected at the exclusion of lower performances. A small stretch factor parameter ($\alpha$) (e.g., close to 0) flattens the spectrum of choice. For an infinitely small stretch factor parameter ($\alpha$), all transmit parameters are basically equiprobable. This of course is only useful if all possibilities are to be tried evenly to set a baseline.

As will be described below, the stretch factor parameter ($\alpha$) is ultimately used to update the SPCF at step 470, and the updated SPCF is then used to compute selection probabilities at step 480. Before describing step 470, the SPCF and its derivation, and techniques for calculating stretch factor parameter ($\alpha$) will now be described.

Selection Probability Computation Function (SPCF)

As noted above, the selection probability computation module 370 includes a SPCF. Derivation of the SPCF will now be described.

The average performance ($F_\mu$) is expressed in equation (B2).

$$F_\mu = \sum_{i=1}^{N} F_i \cdot P(F_i) \tag{B2}$$

It is to be noted that the average performance ($F_\mu$) in equation (B2) is different than the average performance ($\mu_F$) defined above with respect to equation (1). Equation (B2) is the average performance ($F_\mu$) of all the transmit parameters taken together and weighted according to their selection probabilities ($P(F_i)$. In other words, equation (B2) represents the "final" performance as experienced by the user/system.

All performances can be normalized to the maximum performance ($F_{max}$) to define a normalized performance ($\tilde{F}_i$) as shown in equation (B3). The normalized performance ($\tilde{F}_i$) is the ratio of a performance ($F_i$) and maximum performance ($F_{max}$).

$$\tilde{F}_i = \frac{F_i}{F_{max}} \qquad (B3)$$

Based on equation (B1), the probability of each performance can be written as:

$$P(F_i) = \left(\frac{F_i}{F_{max}}\right)^\alpha \cdot P(F_{max}) \qquad (B4)$$

Combining equation (B4) with (B3) provides equation (B5).

$$P(F_i) = \tilde{F}_i^\alpha \cdot P(F_{max}) \qquad (B5)$$

Equation (B5) is the SPCF that is used by the selection probability computation module 370 at step 480 to compute selection probabilities P(F) associated with each performance value relative to the selection probability of the maximum performance P($F_{max}$) being selected. The SPCF requires that an appropriate value is calculated for the stretch factor parameter ($\alpha$).

Calculating the Stretch Factor Parameter ($\alpha$)

Based on equations (B1) and (B4), the sum of the individual selection probabilities (B1) is:

$$\sum_{i=1}^{N} P(F_i) = P(F_{max}) \cdot \sum_{i=1}^{N} \left(\frac{F_i}{F_{max}}\right)^\alpha \qquad (B6)$$

$$= P(F_{max}) \cdot \sum_{i=1}^{N} (\tilde{F}_i)^\alpha$$

The sum of all probabilities must be equal to 1, and therefore equation (B6) can be expressed as:

$$\boxed{P(F_{max}) = \frac{1}{\sum_{i=1}^{N} (\tilde{F}_i)^\alpha}.} \qquad (B7)$$

In other words, the selection probability of the maximum performance (P($F_{max}$)) is inversely proportional to the sum of the normalized performance ($F_i$) raised to the stretch factor parameter ($\alpha$) power, and the value of stretch factor parameter ($\alpha$) can be constrained such that the average performance ($F_\mu$) fulfills certain requirements. For example, the average performance ($F_\mu$) should not drop based on the fact that the system is "trying out" transmit parameters, and should not be $(1-\gamma)\%$ lower than the maximum performance ($F_{max}$) possible, where $\gamma$ represents a target performance ratio. This constraint can be expressed in equation (B8) as:

$$F_\mu \geq \gamma \cdot F_{max} \qquad (B8).$$

When the average performance ($F_\mu$) in equation (B2) is related to the maximum performance ($F_{max}$) and the normalized performance ($\tilde{F}_i$), then equation (B2) can be represented as equation (B9).

$$F_\mu = \sum_{i=1}^{N} F_i \cdot P(F_i) \qquad (B9)$$

-continued $$= \sum_{i=1}^{N} \tilde{F}_i \cdot F_{max} \cdot P(F_i)$$

$$= F_{max} \cdot \sum_{i=1}^{N} \tilde{F}_i \cdot P(F_i)$$

The relationship in equation (B9) can be rewritten as expressed in equation (B10).

$$\sum_{i=1}^{N} \tilde{F}_i \cdot P(F_i) = \frac{F_\mu}{F_{max}} \qquad (B10)$$

Expanding the term $$\sum_{i=1}^{N} \tilde{F}_i \cdot P(F_i)$$

of equation (B10) using the selection probability of each performance as defined in equation (B5) results in equation (B11).

$$\sum_{i=1}^{N} \tilde{F}_i \cdot P(F_i) = \sum_{i=1}^{N} \tilde{F}_i \cdot \left[\tilde{F}_i^\alpha \cdot P(F_{max})\right] = P(F_{max}) \cdot \sum_{i=1}^{N} \tilde{F}_i^{(\alpha+1)} \qquad (B11)$$

The combination of equations (B10) and (B11) results in:

$$P(F_{max}) = \frac{F_\mu}{F_{max}} \cdot \frac{1}{\sum_{i=1}^{N} \tilde{F}_i^{(\alpha+1)}}. \qquad (B12)$$

Equation (B8) assumes that the ratio of the average performance ($F_\mu$) to the maximum performance ($F_{max}$) is within the target performance ratio ($\gamma$)

$$\left(\text{i.e., } \frac{F_\mu}{F_{max}} \geq \gamma\right),$$

and therefore equation (B12) can be expressed as described in equation (B13).

$$P(F_{max}) \geq \frac{\gamma}{\sum_{i=1}^{N} \tilde{F}_i^{(\alpha+1)}} \qquad (B13)$$

When equation (B13) is combined with equation (B7) the result is described in equation (B14), which can then be re-written as equation (B15).

$$\frac{1}{\sum_{i=1}^{N} \tilde{F}_i^\alpha} \geq \frac{\gamma}{\sum_{i=1}^{N} \tilde{F}_i^{(\alpha+1)}} \qquad (B14)$$

-continued $$\frac{\sum_{i=1}^{N} \tilde{F}_i^{(\alpha+1)}}{\sum_{i=1}^{N} \tilde{F}_i^{\alpha}} \geq \gamma \quad \text{(B15)}$$

At step 465, the performance estimator module 365 determines a stretch factor parameter ($\alpha$) to fulfill inequality (B15) for the selected target performance ratio ($\gamma$). Different algorithms may be used to solve inequality (B15) to find a value of stretch factor parameter ($\alpha$). To find a root of the nonlinear equation, minimization of the function can be performed by using Newton's method, the secant method, Brent's method, and the like. Newton-Girard formulas may be used for integer stretch factor parameter ($\alpha$) values by using the identities between the symmetric polynomials and the sums of the $\alpha^{th}$ powers of their variables. Although all these well-known methods can be used to find stretch factor parameter ($\alpha$) values, the optimal embedded implementation is a look-up table. For each quantized value of $\tilde{F}_i$ (between 0 and 1) and quantized value of stretch factor parameter ($\alpha$) (somewhere between 1 and 10), a look-up table can be computed for all $\tilde{F}_i^{\alpha}$.

Computing Selection Probabilities For Each Transmit Parameter

After $\alpha$ has been calculated, at step 470, the selection probability computation module 370 uses the stretch factor parameter ($\alpha$) and the normalized performance ($F_i$) of the EPF to update a selection probability computation function (SPCF). At step 480, the selection probability computation module 370 can then calculate a selection probability for each of the transmit parameters using the formula from equation (B5) which is reproduced below.

$$P(F_i) = \tilde{F}_i^{\alpha} \cdot P(F_{max}) \quad \text{(B5)}$$

More specifically, the selection probability computation module 370 can use the SPCF of equation (B5) to compute/calculate/determine updated selection probabilities selection probabilities ($P(F_1) \ldots P(F_i)$) corresponding to each transmit parameter ($v_1 \ldots v_i$) in the set of available transmit parameters ($v_1 \ldots v_i$) so that each transmit parameter ($v_i$) is associated with a selection probability ($P(F_i)$). By selecting an appropriate value for the stretch factor parameter ($\alpha$), the selection probability computation module 370 weights the selection probability $P(F_i)$ for each of the transmit parameters ($v_1 \ldots v_i$) to optimize the EPF such that the average performance ($F_\mu$) is guaranteed to be at a certain percentage of the maximum performance ($F_{max}$). As explained above, the SPCF is designed to help ensure that the average performance ($F_\mu$) will converge towards the maximum performance ($F_{max}$) ($F_\mu = \gamma \cdot F_{max}$), which ensures a certain minimum performance.

The selection probability computation module 370 then communicates the updated selection probabilities ($P(F_1) \ldots P(F_i)$) for each of the transmit parameters to the storage block 380. The storage block 380 stores the selection probabilities associated with each of the transmit parameters. The method 400 then loops back to step 420, where the method 400 repeats on the next packet to be sent.

For purposes of illustrating one example application of the methods and apparatus for opportunistic link adaptation described herein, an example will now be described where the transmit parameter being adapted is a data rate selected from a set of available data rates to optimize data throughput. However, it is to be appreciated that the term "transmit parameter" is not to be construed as being limited to a "data rate."

Likewise, it is should also be appreciated that although the following description describes techniques for selecting a data rate from a set of available data rates to optimize "throughput," in general the stochastic selection techniques can be implemented in a wide variety of other applications and/or technical fields for selecting a sample/object/parameter from a set of samples/objects/parameters to optimize other types of performance output functions.

Figure 5:
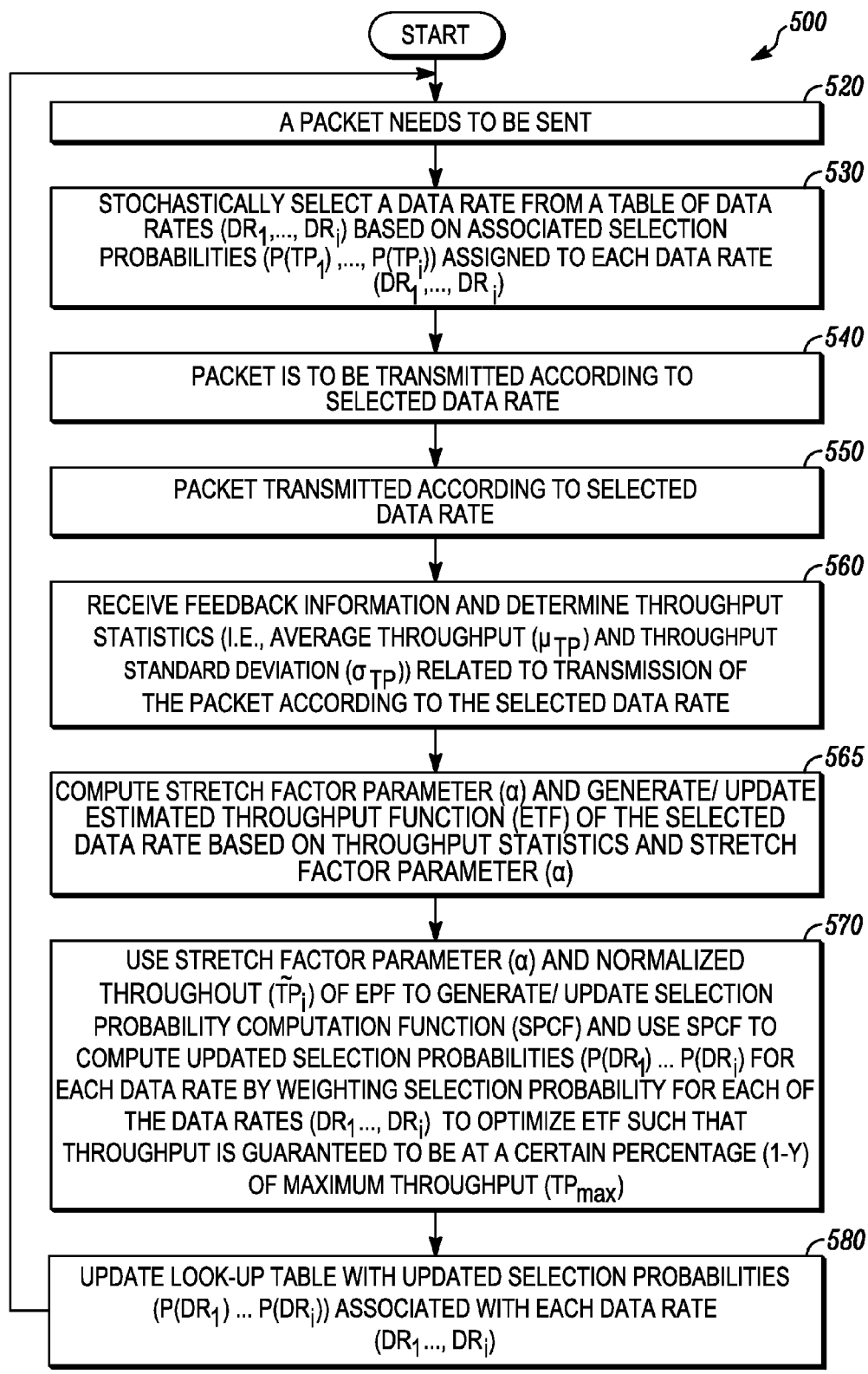
FIG. 5 is a flow chart which illustrates an opportunistic link adaptation method for selecting a data rate from a set of available data rates in accordance with some embodiments.

FIG. 5 is a flow chart which illustrates an opportunistic link adaptation method 500 for selecting a data rate from a set of available data rates in accordance with some embodiments. The opportunistic link adaptation method 500 of FIG. 5 will be described in conjunction with the various modules illustrated in FIG. 3.

In this implementation, the storage block 380 of FIG. 3 is implemented as as a look-up table illustrated below in Table 2 that stores a finite list of available data rates ($DR_1 \ldots DR_i$) and their corresponding selection probabilities ($P(DR_1) \ldots P(DR_i)$). In particular, the first column of the look-up table stores different values of data rates ($DR_1 \ldots DR_i$), and the second column stores corresponding selection probabilities ($P(DR_1) \ldots P(DR_i)$) for each data rate ($DR_1 \ldots DR_i$). Each of the selection probabilities ($P(DR_1) \ldots P(DR_i)$) is dependent on an estimated throughput function (TP). As used herein, the term "selection probability" $P(DR_i)$ refers to a percentage that reflects a number of times a particular data rate ($DR_i$) in a set of possible data rates ($DR_1, \ldots, DR_i$) is to be selected with respect to all other possible selection probabilities $P(DR_i)$. The sum of all probabilities ($P(DR_1) \ldots P(DR_i)$) is equal to one. Each data rate is associated with a selection order, that is, the number of times it should be used as compared to others. This order is proportional to the probability of this data rate being more advantageous from a throughput standpoint than another data rate. This is not a strict proportionality. In other words, a data rate with an order of ten (10) will not be twice as likely to provide a better throughput than a data rate with an order of five (5). As will be shown below, the selection probability $P(DR_i)$ of each data rate is calculated in such a way that overall the performance of the system is commensurate with the performance of an idealized system which "knows" the best data rate possible.

TABLE 2

LOOK-UP TABLE WITH SELECTION PROBABILITIES
FOR EACH VALUE OF A PARTICULAR DATA RATE

| VALUE OF DATA RATE | SELECTION PROBABILITY |
|---|---|
| $DR_1$ | $P(DR_1)$ |
| $DR_2$ | $P(DR_2)$ |
| $DR_3$ | $P(DR_3)$ |
| $DR_4$ | $P(DR_4)$ |
| $DR_i$ | $P(DR_i)$ |

As indicated at step 520, the link adaptation module 310 operates as the node prepares to transmit a packet over a wireless communication link.

At step 530, when the link adaptation module 310 prepares to send the packet, the STPSM 325 stochastically selects an appropriate one of the data rates ($DR_1 \ldots DR_i$) based on the calculated selection probabilities ($P(DR_1) \ldots P(DR_i)$) assigned to each data rate ($DR_1 \ldots DR_i$). In one implementation, a random number generator or other pre-computed table can be used select the $DR_i$.

Thus, a particular data rate value can be selected based on the probability of that particular data rate providing better throughput in comparison to probabilities of other data rates providing better throughput. The order in which the stochastic parameter selection module 425 selects one of the particular data rates is chosen so that advantageous but "risky" data rates are tried first, and conservative yet "safe" data rates are tried last. This selection is called opportunistic because it allows for better data rates to be tried while ensuring that data will be successfully transmitted nonetheless. As will be described below, the stochastic parameter selection module 325 is designed to select data rates such that the link adaptation module 310 focuses or "dwells on" particular ones of the data rates that provide better performance, and only sporadically selects data rates which provide poor performance to build up a knowledge database. Among other benefits, throughput is improved and dead locks during rate selection disappear when there is a completion rate disparity between adjacent data rates At step 540, the link adaptation module 310 sends the packet to the MAC module 340 along with an indication that the packet is to be formatted for transmission at the selected data rate. The MAC module 340 processes the packet to prepare it for transmission over the wireless link at the selected data rate, and passes the packet to the physical layer module 350, where the packet is formatted for transmission at the selected data rate. At step 550, the packet is then transmitted over the wireless link towards its destination at the selected data rate.

After transmitting the packet at the selected data rate, at step 555, the physical layer module 350 at a later time receives transmission feedback information from other nodes and passes this transmission feedback information up the protocol stack to the link adaptation module 310.

At step 560, the transmission statistics computation module (TSCM) 362 uses the transmission feedback information to derive throughput statistics related to the transmission of the packet that was transmitted at the selected data rate. In one implementation, the transmission statistics computation module (TSCM) 362 processes transmission feedback information received over the wireless link to determine (e.g., collect, measure and/or compute) the throughput statistics related to transmission of the packet that was transmitted at the selected data rate. In this particular implementation, the throughput statistics are "indicators of transmission throughput" and can include, for example, an average throughput ($\mu_{TP}$) and a throughput standard deviation ($\sigma_{TP}$). The average throughput ($\mu_{TP}$) is straightforward to compute. The average throughput ($\mu_{TP}$) is a function that is an estimate of the throughput at one particular data rate; there are as many estimates as there are data rates. The throughput standard deviation ($\sigma_{TP}$) is largely dependent on a choice of standard deviation measurement method, and a choice of confidence interval.

Estimated Throughput Function (ETF)

The throughput statistics are provided to the performance estimator module 365 of the link adaptation module 310. At step 565, the throughput estimator module 365 uses the throughput statistics (for the packet(s) that were transmitted at the selected data rate) to generate or update the estimated throughput function (ETF) for the selected data rate. In this implementation, the selection probability computation module 370 generates the ETF based on the average throughput ($\mu_{TP}$) and the throughput standard deviation ($\sigma_{TP}$). Stated differently, the average throughput ($\mu_{TP}$) and the throughput standard deviation ($\sigma_{TP}$) are used to define estimated throughput function (ETF) (TP) that reflects estimated throughput associated with the selected data rate. An example of the ETF is shown below in equation (C1).

$$TP = \mu_{TP} - (\sigma_{TP} \cdot (1-2\beta)) \quad (C1)$$

As noted above, the throughput standard deviation ($\sigma_{TP}$) is largely dependent on a choice of standard deviation measurement method and a choice of confidence interval, and this dependency can be used to control the "aggressiveness" of the data rate selection algorithm. Changing the confidence interval or the standard deviation measurement method does not make one data rate more likely to be better than another from a throughput standpoint.

Aggressiveness Factor ($\beta$)

In the estimated throughput function (ETF), an aggressiveness factor ($\beta$) is used to change the ETF (TP) from a lower end of an arbitrary confidence interval to an upper end.

There are two rationales for measuring the standard deviation ($\sigma_{TP}$) of the throughput estimate.

If the objective is to try data rates that are potentially better but have not been investigated or tried much, it makes sense to favor data rates with large means and large standard deviations (which indicates that they have not been tried much and their prediction is good). In this "aggressive" case, a large value of the ETF (TP) is the most favorable criterion, and therefore it is beneficial to use a larger aggressiveness factor ($\beta$), where an aggressiveness factor ($\beta$) of one (1) is the most aggressive setting. If aggressiveness factor ($\beta$) is 1 then the value of the ETF (TP) is equal to the sum of the average throughput ($\mu_{TP}$) and the throughput standard deviation ($\sigma_{TP}$), and is therefore at the high end of the range of possible values of the ETF (TP).

If the objective is to use data rates that are known to perform well, it makes sense to favor data rates with large means and small standard deviations (which indicate that they are good, based on past experience). In this "conservative" case, a small value of the ETF (TP) is the most favorable criterion, and therefore it is beneficial to use a smaller aggressiveness factor (P), where an aggressiveness factor ($\beta$) of zero (0) is the most conservative setting. If aggressiveness factor ($\beta$) is 0 then the value of the ETF (TP) is equal to the difference between the average throughput ($\mu_{TP}$) and the throughput standard deviation ($\sigma_{TP}$), and is therefore at the low end of the range of possible values of the ETF (TP).

An aggressiveness factor of 0.5 means that the value of the ETF (TP) will always be the average throughput ($\mu_{TP}$), which will naturally favor optimistic predictions.

In one implementation, throughput standard deviation ($\sigma_{TP}$) is preferably calculated using a student t-distribution given that the number of samples is often limited by the available bandwidth of the system. In the context of data rate selection, it is preferable to use an aggressive stance for initial trials and a conservative for final trials (those that occur close to a packet being dropped and no longer retried). If the overall success data rate is fairly low (for example, when the system is being trained or the environment changes too fast), an initial aggressive stance can be subdued, and made more conservative. The range of variation of throughput standard deviation ($\sigma_{TP}$) is driven by the confidence level assigned to the t-distribution since the throughput standard deviation ($\sigma_{TP}$) itself is not being estimated, but rather the confidence interval of the average throughput ($\mu_{TP}$) is being estimated.

In one implementation, the ETF is converted into a selection probability or selection order. The ETFs are actual possible outcomes (i.e., not random variables). The throughput estimates are random variables, and therefore a probability of one being larger than the other can be established. This probability, however, is equivocal (equal to 0.5) when there are few measurements. The "stance", therefore, is a better criterion for selecting an order. Arbitrarily, an ETF that is twice as large should be twice as likely to be selected. This can be generalized to:

$$P(TP_i) = k^\alpha \cdot P(TP_j) \text{ for } TP_i = k \cdot TP_j \tag{D1}$$

The ETFs ($TP_i$, $TP_j$) are throughput estimate functions associated with particular data rates i, j. The throughput of a particular data rate is an "estimate" since it can not be measured when it is only used sporadically. In equation (D1), k represents the ratio of an estimated throughput function (ETF) associated with data rate i ($TP_i$) with respect to an estimated throughput function (ETF) associated with data rate j ($TP_j$), and the parameter $\alpha$ is a "stretch factor parameter." The stretch factor parameter ($\alpha$) determines the proportionality relationship between the priority order and the throughput estimation. The setting of the stretch factor parameter ($\alpha$) depends on how much penalty is acceptable from a throughput perspective as compared to the maximum throughput in order to "try out" other possibilities. A large stretch factor parameter ($\alpha$) allows for larger throughput parameters/estimates to be selected at the exclusion of lower throughputs. A small stretch factor parameter ($\alpha$) (e.g., close to 0) flattens the spectrum of choice. For an infinitely small stretch factor parameter ($\alpha$), all data rates are basically equiprobable. This of course is only useful if all possibilities are to be tried evenly to set a baseline.

As will be described below, the stretch factor parameter ($\alpha$) is ultimately used to update the SPCF at step 570, and the updated SPCF is then used to compute selection probabilities at step 580. Before describing step 570, the SPCF and its derivation, and techniques for calculating stretch factor parameter ($\alpha$) will now be described.

Selection Probability Computation Function (SPCF)

As noted above, the selection probability computation module 370 includes a SPCF. Derivation of the SPCF will now be described.

The average throughput ($TP_\mu$) is expressed in equation (D2).

$$TP_\mu = \sum_{i=1}^{N} TP_i \cdot P(TP_i) \tag{D2}$$

It is to be noted that the average throughput ($TP_\mu$) in equation (D2) is different than the average throughput ($\mu_{TP}$) defined above with respect to equation (1). Equation (D2) is the average throughput ($TP_\mu$) of all the data rates taken together and weighted according to their selection probabilities $P(TP_i)$. In other words, equation (D2) represents the "final" throughput as experienced by the user/system.

All throughputs can be normalized to the maximum throughput ($TP_{max}$) to define a normalized throughput ($\tilde{TP}_i$) as shown in equation (D3). The normalized throughput ($\tilde{TP}_i$) is the ratio of a throughput ($TP_i$) and maximum throughput ($TP_{max}$).

$$\tilde{TP}_i = \frac{TP_i}{TP_{max}} \tag{D3}$$

Based on equation (D1), the probability of each throughput can be written as:

$$P(TP_i) = \left(\frac{TP_i}{TP_{max}}\right)^\alpha \cdot P(TP_{max}) \tag{D4}$$

Combining equation (D4) with (D3) provides equation (D5).

$$P(TP_i) = \tilde{TP}_i^\alpha \cdot P(TP_{max}) \tag{D5}$$

Equation (D5) is the SPCF that is used by the selection probability computation module 370 at step 580 to compute selection probabilities P(TP) associated with each throughput value relative to the selection probability of the maximum throughput $P(TP_{max})$ being selected. The SPCF requires that an appropriate value is calculated for the stretch factor parameter ($\alpha$).

Calculating the Stretch Factor Parameter ($\alpha$)

Based on equations (D1) and (D4), the sum of the individual selection probabilities (D1) is:

$$\sum_{i=1}^{N} P(TP_i) = P(TP_{max}) \cdot \sum_{i=1}^{N} \left(\frac{TP_i}{TP_{max}}\right)^\alpha \tag{D6}$$

$$= P(TP_{max}) \cdot \sum_{i=1}^{N} \left(\tilde{TP}_i\right)^\alpha$$

The sum of all probabilities must be equal to 1, and therefore equation (D6) can be expressed as:

$$\boxed{P(TP_{max}) = \frac{1}{\sum_{i=1}^{N} \left(\tilde{TP}_i\right)^\alpha}} \tag{D7}$$

In other words, the selection probability of the maximum throughput ($P(TP_{max})$) is inversely proportional to the sum of the normalized throughput ($\tilde{TP}_i$) raised to the stretch factor parameter ($\alpha$) power, and the value of stretch factor parameter ($\alpha$) can be constrained such that the average throughput ($TP_\mu$) fulfills certain requirements. For example, the average throughput ($TP_\mu$) should not drop based on the fact that the system is "trying out" data rates, and should not be (1−γ) % lower than the maximum throughput ($TP_{max}$) possible, where γ represents a target performance ratio. This constraint can be expressed in equation (D8) as:

$$TP_\mu \geq \gamma \cdot TP_{max} \tag{D8}$$

When the average throughput ($TP_\mu$) in equation (D2) is related to the maximum throughput ($TP_{max}$) and the normalized throughput ($TP_i$), then equation (D2) can be represented as equation (D9).

$$TP_\mu = \sum_{i=1}^{N} TP_i \cdot P(TP_i) \tag{D9}$$

$$= \sum_{i=1}^{N} \tilde{TP}_i \cdot TP_{max} \cdot P(TP_i)$$

-continued $$= TP_{max} \cdot \sum_{i=1}^{N} \tilde{T}P_i \cdot P(TP_i)$$

The relationship in equation (D9) can be rewritten as expressed in equation (D10).

$$\sum_{i=1}^{N} \tilde{T}P_i \cdot P(TP_i) = \frac{TP_\mu}{TP_{max}} \quad (D10)$$

Expanding the term $$\sum_{i=1}^{N} \tilde{T}P_i \cdot P(TP_i)$$

of equation (D10) using the selection probability of each throughput as defined in equation (D5) results in equation (D11).

$$\sum_{i=1}^{N} \tilde{T}P_i \cdot P(TP_i) = \sum_{i=1}^{N} \tilde{T}P_i \cdot [\tilde{T}P_i^\alpha \cdot P(TP_{max})] \quad (D11)$$

$$= P(TP_{max}) \cdot \sum_{i=1}^{N} \tilde{T}P_i^{(\alpha+1)}$$

The combination of equations (D10) and (D11) results in:

$$P(TP_{max}) = \frac{TP_\mu}{TP_{max}} \cdot \frac{1}{\sum_{i=1}^{N} \tilde{T}P_i^{(\alpha+1)}}. \quad (D12)$$

Equation (D8) assumes that the ratio of the average throughput ($TP_\mu$) to the maximum throughput ($TP_{max}$) is within the target performance ratio ($\gamma$) (i.e., $$\frac{TP_\mu}{TP_{max}} \geq \gamma),$$

and therefore equation (D12) can be expressed as described in equation (D13).

$$P(TP_{max}) \geq \frac{\gamma}{\sum_{i=1}^{N} \tilde{T}P_i^{(\alpha+1)}} \quad (D13)$$

When equation (D13) is combined with equation (D7) the result is described in equation (D14), which can then be re-written as equation (D15).

$$\frac{1}{\sum_{i=1}^{N} \tilde{T}P_i^\alpha} \geq \frac{\gamma}{\sum_{i=1}^{N} \tilde{T}P_i^{(\alpha+1)}} \quad (D14)$$

$$\boxed{\frac{\sum_{i=1}^{N} \tilde{T}P_i^{(\alpha+1)}}{\sum_{i=1}^{N} \tilde{T}P_i^\alpha} \geq \gamma} \quad (D15)$$

At step 565, the performance estimator module 365 determines a stretch factor parameter ($\alpha$) to fulfill inequality (D15) for the selected target performance ratio ($\gamma$). Different algorithms may be used to solve inequality (D15) to find a value of stretch factor parameter ($\alpha$). To find a root of the nonlinear equation minimization of the function can be performed by using Newton's method, the secant method, Brent's method, etc. Newton-Girard formulas may be used for integer stretch factor parameter ($\alpha$) values by using the identities between the symmetric polynomials and the sums of the $\alpha^{th}$ powers of their variables. Although all these well-known methods can be used to find stretch factor parameter ($\alpha$) values, the most appropriate embedded implementation is a look-up table. For each quantized value of $\tilde{T}P_i$ (between 0 and 1) and quantized value of stretch factor parameter ($\alpha$) (somewhere between 1 and 10), a look-up table can be computed for all $\tilde{T}P_i^\alpha$.

Computing Selection Probabilities For Each Data Rate

After $\alpha$ has been calculated, at step 570, the selection probability computation module 370 uses the stretch factor parameter ($\alpha$) and the normalized throughput ($\tilde{T}P_i$) of the ETF to update a selection probability computation function (SPCF). At step 580, the selection probability computation module 370 can then calculate a selection probability for each of the data rates using the formula from equation (D5) which is reproduced below.

$$P(TP_i) = \tilde{T}P_i^\alpha \cdot P(TP_{max}) \quad (D5)$$

More specifically, the selection probability computation module 370 can use the SPCF of equation (D5) to compute/calculate/determine) updated selection probabilities selection probabilities ($P(TP_1) \ldots P(TP_i)$) corresponding to each data rate ($DR_1 \ldots DR_i$) in the set of available data rates ($DR_1 \ldots DR_i$) so that each data rate ($DR_i$) is associated with a selection probability ($P(TP_i)$). By selecting an appropriate value for the stretch factor parameter ($\alpha$), the selection probability computation module 370 weights the selection probability $TP_i$ for each of the data rates ($DR_1 \ldots DR_i$) to optimize the ETF such that the average throughput ($TP_\mu$) is guaranteed to be at a certain percentage of the maximum throughput ($TP_{max}$). As explained above, the SPCF is designed to help ensure that the average throughput ($TP_\mu$) will converge towards the maximum throughput ($TP_{max}$)($TP_\mu = \gamma \cdot TP_{max}$), which ensures a certain minimum throughput performance.

The selection probability computation module 370 then communicates the updated selection probabilities ($P(TP_1) \ldots P(TP_i)$) for each of the data rates to the storage block 380. The storage block 380 stores the selection probabilities associated with each of the data rates. The method 500 then loops back to step 520.

In the foregoing description, embodiments have been described as applied to opportunistic link adaptation techniques in which data rates of a set of data rates are stochastically selected to optimize data throughput. However, this application is illustrative of only one possible application, and the disclosed techniques can generally be applied in a wide variety of other contexts for stochastically selecting any type of sample amongst a population of samples. For example, other possible applications that occur in the context of wireless communication networks include, but are not limited to, selection of neighbor nodes for ranging services, and link quality probing or prediction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A link adaptation method, comprising:

storing, at a node, a set of values of transmit parameters ($v_1 \ldots v_i$) and corresponding selection probabilities ($P(v_1) \ldots P(v_i)$) for each of the transmit parameters ($v_1 \ldots v_i$), wherein each of the transmit parameters ($v_1 \ldots v_i$) is associated with a corresponding selection probability;

stochastically selecting, at the node by a stochastic transmit parameter selection module (STPSM), a particular transmit parameter from a set of available transmit parameters based on the selection probabilities ($P(v_1) \ldots P(v_i)$) associated with each of the transmit parameters;

transmitting a packet from the node according to the particular transmit parameter;

receiving, at the node, transmission feedback information which relates to transmission of the packet according to the particular transmit parameter, and using the transmission feedback information to derive performance statistics related to the transmission of the packet according to the particular transmit parameter;

using the performance statistics to specify an estimated performance function (EPF) (F) for the particular transmit parameter that reflects estimated performance associated with the particular transmit parameter; and updating a selection probability computation function (SPCF) to generate updated selection probabilities, selection probabilities ($P(v_1) \ldots P(v_i)$) corresponding to each transmit parameter ($v_1 \ldots v_i$) in the set of available transmit parameters ($v_1 \ldots v_i$).

2. A method according to claim 1, further comprising:

updating the selection probabilities ($P(v_1) \ldots P(v_i)$) for each of the transmit parameters ($v_1 \ldots v_i$) that are stored at the node with the updated selection probabilities $(P(v_1) \ldots P(v_i))$ associated with each of the transmit parameters $(v_1 \ldots v_i)$;

preparing to transmit another packet; and stochastically selecting, at the node by the stochastic transmit parameter selection module (STPSM), one transmit parameter from the set of available transmit parameters $(v_1 \ldots v_i)$ based on the updated selection probabilities $(P(v_1) \ldots P(v_i))$ associated with each of the transmit parameters $(v_1 \ldots v_i)$.

3. A method according to claim 1, wherein the selection probabilities $(P(v_1) \ldots P(v_i))$ are weighted to optimize the EPF such that average performance $(F_\mu)$ will converge towards a maximum performance $(F_{max})$ and is guaranteed to be within a certain percentage of the maximum performance $(F_{max})$.

4. A method according to claim 1, wherein each of the updated selection probabilities $(P(v_1) \ldots P(v_i))$ specifies:

a percentage that reflects a number of times a particular transmit parameter $(v_i)$ in a set of possible transmit parameters $(v_1, \ldots, v_i)$ is to be selected with respect to all other possible selection probabilities $P(v_i)$.

5. A method according to claim 1, wherein the performance statistics comprise an average performance $(\mu_F)$ associated with transmission of the packet according to the particular transmit parameter and a performance standard deviation $(\sigma_F)$ function for transmission of the packet according to the particular transmit parameter, and wherein the estimated performance function (EPF) (F) comprises:

$$F = \mu_F - (\sigma_F \cdot (1 - 2\beta)),$$

wherein the EPF (F) comprises an aggressiveness factor $((\beta))$ for controlling aggressiveness of the EPF (F).

6. A method according to claim 1, wherein an average performance $(F_\mu)$ is:

$$F_\mu = \sum_{i=1}^{N} F_i \cdot P(v_i), \text{ and}$$

wherein a ratio of the average performance $(F_\mu)$ to a maximum performance $(F_{max})$ is within a target performance ratio $(\gamma)$ and further wherein N represents a number of transmit parameters in the set of available transmit parameters.

7. A method according to claim 1, further comprising:

determining a normalized performance $(\tilde{F}_i)$ that is the ratio of a performance $(F_i)$ for transmit parameter i and maximum performance $(F_{max})$.

8. A method according to claim 7, further comprising:

calculating a stretch factor parameter $(\alpha)$ for a target performance ratio $(\gamma)$.

9. A method according to claim 8, wherein the step of calculating the stretch factor parameter $(\alpha)$ for the target performance ratio $(\gamma)$, comprises:

calculating the stretch factor parameter $(\alpha)$ to fulfill:

$$\frac{\sum_{i=1}^{N} \tilde{F}_i^{(\alpha+1)}}{\sum_{i=1}^{N} \tilde{F}_i^{\alpha}} \geq \gamma$$

for the target performance ratio $(\gamma)$, wherein the calculated stretch factor parameter $(\alpha)$ is constrained such that an average performance $(F_\mu)$ is greater than or equal to (1–the target performance ratio $(\gamma)$) percent of the maximum performance $(F_{max})$ and further wherein N represents a number of transmit parameters in the set of available transmit parameters.

10. A method according to claim 8, wherein the step of updating a selection probability computation function (SPCF) to generate updated selection probabilities selection probabilities $(P(v_1) \ldots P(v_i))$ corresponding to each transmit parameter $(v_1 \ldots v_i)$ in the set of available transmit parameters $(v_1 \ldots v_i)$, comprises:

updating the selection probability computation function (SPCF) based on the stretch factor parameter $(\alpha)$ and the normalized performance $(\tilde{F}_i)$ to generate updated selection probabilities, selection probabilities $(P(v_1) \ldots P(v_i))$ corresponding to each transmit parameter $(v_1 \ldots v_i)$ in the set of available transmit parameters $(v_1 \ldots v_i)$.

11. A method according to claim 8, wherein the selection probability computation function (SPCF), comprises:

$$P(v_i) = \tilde{F}_i^{\alpha} \cdot P(F_{max})$$

wherein the selection probability of performance at a particular transmit parameter i $(P(v_i)$ is equal to the product of a selection probability of the maximum performance $(P(F_{max}))$ and the normalized performance $(\tilde{F}_i)$ raised to the stretch factor parameter $(\alpha)$ power.

12. A method according to claim 1, wherein the transmit parameters $(v_1 \ldots v_i)$ comprise data rates $(DR_1 \ldots DR_i)$.

13. A method according to claim 12, wherein the performance is data throughput.

14. A node, comprising:

a memory designed to store a set of values of transmit parameters $(v_1 \, v_i)$ and corresponding selection probabilities $(P(v_1) \ldots P(v_i))$ for each of the transmit parameters $(v_1 \ldots v_i)$, wherein each of the transmit parameters $(v_1 \ldots v_i)$ is associated with a corresponding selection probability;

a link adaptation module designed to use a stochastic transmit parameter selection module (STPSM) to stochastically select a particular transmit parameter from a set of available transmit parameters based on the selection probabilities $(P(v_1) \ldots P(v_i))$ associated with each of the transmit parameters;

a transmitter designed to transmit a packet according to the particular transmit parameter from the node;

a receiver designed to receive transmission feedback information which relates to transmission of the packet according to the particular transmit parameter, and wherein the link adaptation module is designed to:

derive performance statistics based on the transmission feedback information, wherein the performance statistics are related to the transmission of the packet according to the particular transmit parameter; and generate, based on an updated selection probability computation function (SPCF), updated selection probabilities, selection probabilities ($P(v_1) \ldots P(v_i)$) corresponding to each transmit parameter ($v_1 \ldots v_i$) in the set of available transmit parameters ($v_1 \ldots v_i$).

15. A node according to claim 14, further comprising:
means for updating the selection probabilities ($P(v_1) \ldots P(v_i)$) for each of the transmit parameters ($v_1 \ldots v_i$) that are stored at the node with the updated selection probabilities ($P(v_1) \ldots P(v_i)$) associated with each of the transmit parameters ($v_1 \ldots v_i$);
means for preparing to transmit another packet; and
means for stochastically selecting, at the node by the stochastic transmit parameter selection module (STPSM), one transmit parameter from the set of available transmit parameters ($v_1 \ldots v_i$) based on the updated selection probabilities ($P(v_1) \ldots P(v_i)$) associated with each of the transmit parameters ($v_1 \ldots v_i$).

16. A node according to claim 14, wherein the selection probabilities ($P(v_1) \ldots P(v_i)$) are weighted to optimize an estimated performance function (EPF) such that average performance ($F_\mu$) will converge towards a maximum performance ($F_{max}$) and is guaranteed to be within a certain percentage of the maximum performance ($F_{max}$).

17. A node according to claim 14, wherein each of the updated selection probabilities ($P(v_1) \ldots P(v_i)$) specifies:
a percentage that reflects a number of times a particular transmit parameter ($v_i$) in a set of possible transmit parameters ($v_1 \ldots v_i$) is to be selected with respect to all other possible selection probabilities $P(v_i)$.

18. A node according to claim 14, wherein the performance statistics comprise an average performance ($\mu_F$) associated with transmission of the packet according to the particular transmit parameter and a performance standard deviation ($\sigma_F$) function for transmission of the packet according to the particular transmit parameter, and wherein an estimated performance function (EPF) (F) comprises:

$$F = \mu_F - (\sigma_F \cdot (1 - 2\beta)),$$

wherein the EPF (F) comprises an aggressiveness factor ($\beta$) for controlling aggressiveness of the EPF (F).

19. A node according to claim 14, wherein an average performance ($F_\mu$) is:

$$F_\mu = \sum_{i=1}^{N} F_i \cdot P(v_i), \text{ and}$$

wherein a ratio of the average performance ($F_\mu$) to a maximum performance ($F_{max}$) is within a target performance ratio ($\gamma$) and further wherein N represents a number of transmit parameters in the set of available transmit parameters.

20. A node according to claim 14, wherein the link adaptation module is further designed to:
specify, based on the performance statistics, an estimated performance function (EPF) (F) for the particular transmit parameter that reflects estimated performance associated with the particular transmit parameter,
determine a normalized performance ($\tilde{F}_i$) that is the ratio of a performance ($F_i$) for transmit parameter i and a maximum performance ($F_{max}$), and a stretch factor parameter ($\alpha$) for a target performance ratio ($\gamma$); and, wherein the stretch factor parameter ($\alpha$) for the target performance ratio ($\gamma$) is calculated to fulfill:

$$\frac{\sum_{i=1}^{N} \tilde{F}_i^{(\alpha+1)}}{\sum_{i=1}^{N} \tilde{F}_i^{\alpha}} \geq \gamma$$

for the target performance ratio ($\gamma$), wherein the calculated stretch factor parameter ($\alpha$) is constrained such that the average performance ($F_\mu$) is greater than or equal to (1−the target performance ratio ($\gamma$)) percent than the maximum performance ($F_{max}$), wherein N represents a number of transmit parameters in the set of available transmit parameters and further wherein the link adaptation module is further designed to:
generate, based on a selection probability computation function (SPCF) that comprises the stretch factor parameter ($\alpha$) and the normalized performance ($\tilde{F}_i$), updated selection probabilities, selection probabilities ($P(v_1) \ldots P(v_i)$) corresponding to each transmit parameter ($v_1 \ldots v_i$) in the set of available transmit parameters ($v_1 \ldots v_i$).

21. A node according to claim 20, wherein the selection probability computation function (SPCF), comprises:

$$P(v_i) = \tilde{F}_i^{\alpha} \cdot P(F_{max})$$

wherein the selection probability of performance at a particular transmit parameter i is equal to the product of a selection probability of the maximum performance ($P(F_{max})$) and the normalized performance ($\tilde{F}_i$) raised to the stretch factor parameter ($\alpha$) power.

22. A node according to claim 14, wherein the transmit parameters ($v_1 \ldots v_i$) comprise data rates ($DR_1 \ldots DR_i$), and wherein the performance is data throughput.

23. A method, comprising:
receiving, at a node, transmission feedback information and using the transmission feedback information to compute performance statistics related to a transmission of a packet according to a particular transmit parameter;
specifying, at the node, based on the performance statistics, an estimated performance function that reflects estimated performance associated with the particular transmit parameter;
determining, at the node, a stretch factor parameter for a target performance ratio; and
generating, at the node, updated selection probabilities corresponding to each transmit parameter in a set of available transmit parameters based on the stretch factor parameter.

24. A node, comprising:
a transmitter operating to transmit a packet from the node according to a particular transmit parameter; and
a processor communicatively coupled to the transmitter, the processor operating to
derive, based on transmission feedback information, performance statistics related to the transmission of the packet,
define, based on the derived performance statistics, an estimated performance function that reflects estimated performance associated with the particular transmit parameter, and determine a stretch factor parameter for a target performance ratio, and generate, based on a selection probability computation function that comprises the stretch factor parameter, updated selection probabilities corresponding to each transmit parameter in a set of available transmit parameters.

25. A method, comprising:

computing, at a node, based on transmission feedback information, performance statistics related to a transmission of a packet according to a particular transmit parameter;

specifying, at the node, based on the performance statistics, an estimated performance function that reflects estimated performance associated with the particular transmit parameter;

determining, at the node, a stretch factor parameter for a target performance ratio; and generating, at the node, updated selection probabilities corresponding to each transmit parameter in a set of available transmit parameters based on the stretch factor parameter.

* * * * *

UNITED STATES PATENT AND TRADEMARK OFFICE
CERTIFICATE OF CORRECTION

PATENT NO. : 8,036,168 B2
APPLICATION NO. : 12/021599
DATED : October 11, 2011
INVENTOR(S) : Strutt et al.

It is certified that error appears in the above-identified patent and that said Letters Patent is hereby corrected as shown below:

Title Page, Item (75), under "Inventors", in Column 1, Line 2, delete "Peter B. Deoge," and insert -- Peter B. Doege, --, therefor.

In Column 3, Line 3, delete "$(P(v_i) \ldots P(v_i))$" and insert -- $(P(v_1) \ldots P(v_i))$ --, therefor.

In Column 6, Line 66, delete "$(P(v_i), \ldots, P(v_i))$" and insert -- $(P(v_1), \ldots, P(v_i))$ --, therefor.

In Column 6, Line 67, delete "$(P(v_i), \ldots, P(v_i))$" and insert -- $(P(v_1), \ldots, P(v_i))$ --, therefor.

In Column 7, Line 7, delete "$(P(v_i), \ldots, P(v_i))$" and insert -- $(P(v_1), \ldots, P(v_i))$ --, therefor.

In Column 9, Line 3, delete "$(v_F)$." and insert -- $(\sigma_F)$. --, therefor.

In Column 11, Line 47, delete " $(F_i)$ " and insert -- $(\tilde{F}_i)$ --, therefor.

In Column 16, Line 38, delete "(P)," and insert -- (β), --, therefor.

In Column 18, Line 58, delete " $(TP_i),$ " and insert -- $(\tilde{TP}_i),$ --, therefor.

In Column 23, Line 35, in Claim 5, delete "((β)" and insert -- (β) --, therefor.

In Column 24, Line 39, in Claim 11, delete " $P(v_i) = \tilde{F}_i^\alpha \cdot P(F_{max})$ " and insert -- $P(v_i) = \tilde{F}_i^\alpha \cdot P(F_{max})$, --, therefor.

In Column 24, Line 41, in Claim 11, delete "i (P ($v_i$)" and insert -- i (P ($v_i$)) --, therefor.
In Column 24, Line 51, in Claim 14, delete "($v_1$ $v_i$)" and insert -- ($v_1 \ldots v_i$) --, therefor.

Signed and Sealed this
Eighth Day of January, 2013

David J. Kappos
*Director of the United States Patent and Trademark Office*

In Column 25, Line 33, in Claim 17, delete "$(v_1 \ldots v_i)$" and insert -- $(v_1, \ldots, v_i)$ --, therefor.